US012231793B2

(12) United States Patent
Zhang

(10) Patent No.: US 12,231,793 B2
(45) Date of Patent: Feb. 18, 2025

(54) LOW ROW NOISE RAMP GENERATOR

(71) Applicant: Gigajot Technology, Inc., Glendale, CA (US)

(72) Inventor: Dexue Zhang, Cupertino, CA (US)

(73) Assignee: Gigajot Technology, Inc., Glendale, CA (US)

( * ) Notice: Subject to any disclaimer, the term of this patent is extended or adjusted under 35 U.S.C. 154(b) by 70 days.

(21) Appl. No.: 18/064,871

(22) Filed: Dec. 12, 2022

(65) Prior Publication Data

US 2023/0188866 A1    Jun. 15, 2023

Related U.S. Application Data

(60) Provisional application No. 63/288,718, filed on Dec. 13, 2021.

(51) Int. Cl.
*H04N 25/709*    (2023.01)
*H04N 25/78*    (2023.01)

(52) U.S. Cl.
CPC .......... *H04N 25/709* (2023.01); *H04N 25/78* (2023.01)

(58) Field of Classification Search
CPC .............................. H04N 25/709; H04N 25/78
USPC ..................................................... 348/207.99
See application file for complete search history.

(56) References Cited

U.S. PATENT DOCUMENTS

| | | | |
|---|---|---|---|
| 8,797,440 B2 | 8/2014 | Matsuura | |
| 9,774,811 B1* | 9/2017 | Ebihara | .................. H03K 4/502 |
| 10,721,427 B2 | 7/2020 | Liu | |
| 2011/0050967 A1 | 3/2011 | Matsumoto et al. | |
| 2016/0301883 A1* | 10/2016 | Kim | ........................ H04N 25/65 |

OTHER PUBLICATIONS

International Search Report and Written Opinion from PCT/S2022/052716, dated Apr. 24, 2023, Gigajot Technology, Inc., pp. 1-13.
International Preliminary Report on Patentability from PCT/S2022/052716, dated Jun. 27, 2024, Gigajot Technology, Inc., pp. 1-9.

* cited by examiner

*Primary Examiner* — Joel W Fosselman
(74) *Attorney, Agent, or Firm* — Robert C. Kowert; Kowert, Hood, Munyon, Rankin & Goetzel, P.C.

(57) ABSTRACT

An image capturing device may include a ramp generator circuit that may be used in performance of analog-to-digital conversion of image signals from pixels of an image sensor. The ramp generator circuit may generate a voltage having one or more rising and/or falling portions, using a reference voltage and an integration current. The ramp generator circuit may include a first sample-and-hold switch and/or a second sample-and-hold switch. The ramp generator circuit may selectively turn off the first and/or the second sample-and-hold switches to hold the reference voltage and/or a bias voltage that is used for generating the integration current during analog-to-digital conversion of the image signals. As a result, reference voltage, bias voltage, and/or integration current may be held and substantially stabilized during the analog-to-digital conversion.

20 Claims, 10 Drawing Sheets

LOW ROW NOISE RAMP GENERATOR

BACKGROUND

This application claims benefit of priority of U.S. Provisional Application Ser. No. 63/288,718, entitled "Low Row Noise Ramp Generator", filed Dec. 13, 2021, which is hereby incorporated in reference herein in its entirety.

TECHNICAL FIELD

This disclosure relates generally to an image capturing device (e.g., a camera) and more specifically to a ramp generator circuit of an image capturing device used for analog-to-digital conversion of pixel signals.

DESCRIPTION OF THE RELATED ART

Image capturing devices (e.g., cameras) are used in a variety of electronic devices, such as mobile devices (e.g., smart phones, tablets, laptops, etc.), robotic equipment, or security monitoring devices, among others. An image capturing device may use an image sensor to capture light from an environment. The image sensor may include a plurality of light-gathering pixels. The pixels may accumulate electrical charge when exposed to light. The electrical charge may be read out of the pixels to generate image signals. The image signals originally are analog signals (e.g., analog voltages) that may be converted to digital signals. Afterwards, the digital image signals may be processed to produce images. Sometimes, an image capturing device may use a ramp generator circuit in performance of the analog-to-digital (A-to-D) conversion of image signals. The ramp generator circuit can be subject to noises which further affect the image quality. As a result, different pixels, especially those (e.g., pixels on different rows) whose A-to-D conversion are performed at different time, may generate different digital image signals even if the pixels are exposed to identical luminance intensities. Such row-to-row noises, for example, can cause undesired image effects, e.g., stripes in abnormal color in finally-generated images. Thus, it is desirable to have ramp generator circuits designed to reduce such noises.

Figure 1:
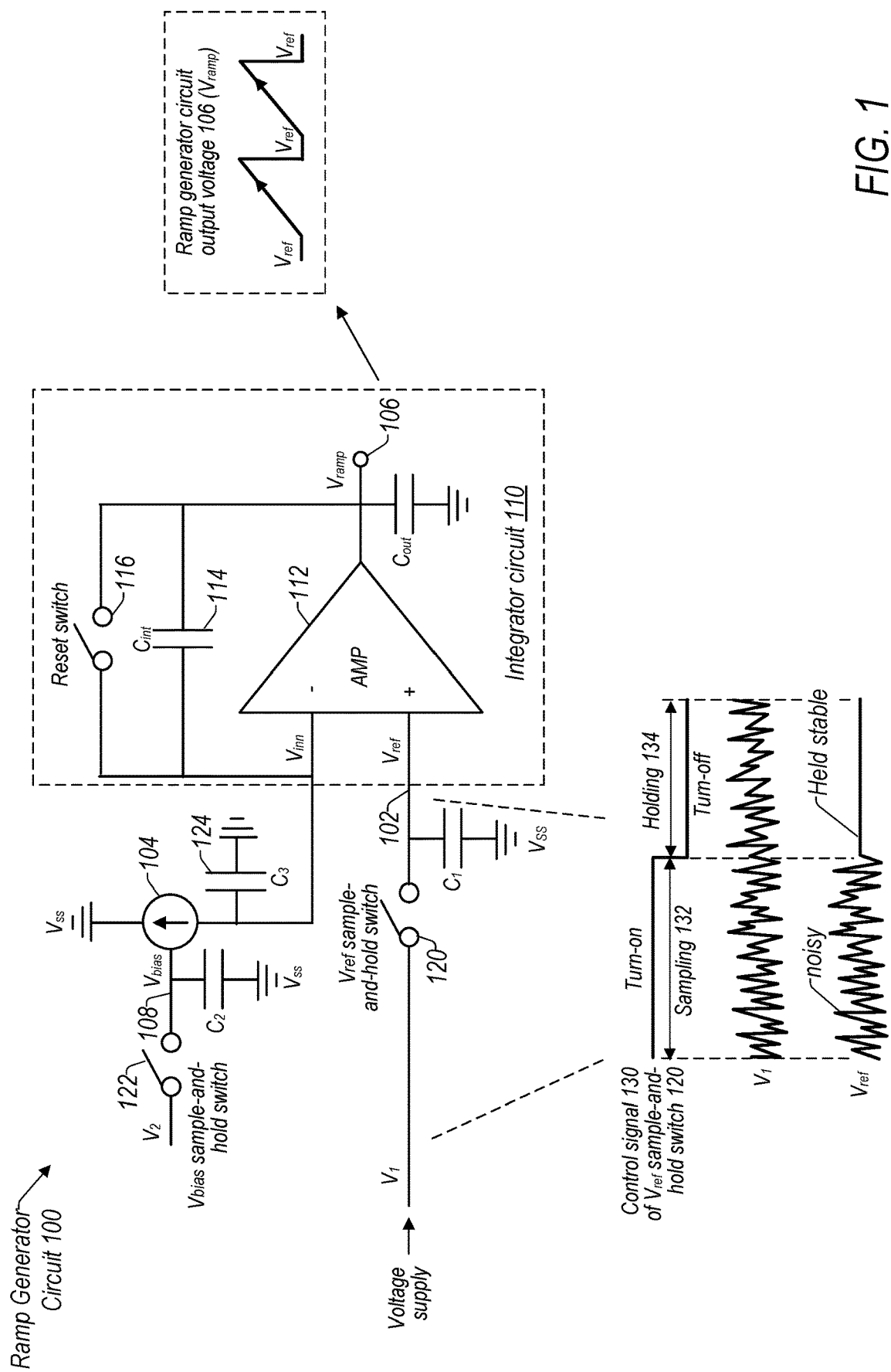
FIG. 1 is a schematic diagram of an example ramp generator circuit, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Various embodiments described herein relate to a ramp generator circuit of an image capturing device, e.g., a camera. In some embodiments, the image capturing device may include one or more lenses and an image sensor that includes a plurality of light-gathering pixels. In some embodiments, the pixels may be organized in a pixel array having one or more rows and/or one or more columns. Light captured by the image capturing device may pass through the lenses to reach the pixels of the image sensor. When exposed to light, the pixels may accumulate electrical charge, which may be read out to generate image signals. In some embodiments, the image signals read out of the pixels originally may be analog signals, e.g., analog voltages. In some embodiments, the image capturing device may perform analog-to-digital (A-to-D) conversion to convert the image signals from analog signals to digital signals, and the digital image signals may be further processed, e.g., by an image signal processor (ISP), to generate one or more images. In some embodiments, the image capturing device may be part of an electronic device, such as a mobile device (e.g., a smart phone, tablet, laptops, etc.), robotic equipment, or security monitoring device, among others.

In some embodiments, the image capturing device may use a ramp generator circuit in performance of A-to-D conversion of image signals. For example, the ramp generator circuit may generate a linear rising (or falling) analog signal (e.g., voltage or $v_{ramp}$). Given a pixel, the analog image signal (e.g., an analog voltage or $v_{readout}$) read out of the pixel may be compared against the signal (e.g., $v_{ramp}$) from the ramp generator circuit, e.g., using a comparator circuit. The time it takes for $v_{ramp}$ to become equal with $v_{readout}$ (e.g., the time it takes for the ramp generator circuit to trip the comparator), may be measured or calculated, based on which a digital value of the analog image signal may be determined. In some embodiments, the ramp generator circuit may use a reference voltage (e.g., $v_{ref}$) and an integration current (e.g., $i_{int}$) as input to generate the rising or falling signal (e.g., $v_{ramp}$) as output. Further, in some embodiments, a bias voltage (e.g., $v_{bias}$) may be used in generation of the integration current (e.g., $i_{int}$) Sometimes, values of the reference voltage (e.g., $v_{ref}$), bias voltage (e.g., $v_{bias}$), and/or integration current (e.g., $i_{int}$) may fluctuate due to noises, e.g., temperature variation and/or other system noises. The fluctuation may propagate and become a major contribution to noises in A-to-D conversion of image signals.

Thus, to reduce impact of the noises, in some embodiments, the ramp generator circuit may include special designs to stabilize the reference voltage, bias voltage, and/or integration current. For example, in some embodiments, the ramp generator circuit may obtain the reference voltage (e.g., $v_{ref}$) from a voltage supply. Fluctuation of the reference voltage (e.g., $v_{ref}$) obtained by the ramp generator circuit may be caused by fluctuation of the output voltage of the voltage supply. Thus, in some embodiments, the ramp generator circuit may include a switch coupled between the output voltage of the power supply and the reference voltage (e.g., $v_{ref}$) obtained by the ramp generator circuit. The ramp generator circuit may selectively turn off the switch to decouple the reference voltage (e.g., $v_{ref}$) obtained by the ramp generator circuit from the noisy output voltage of the power supply. As a result, the ramp generator circuit may substantially reduce fluctuation of the reference voltage (e.g., $v_{ref}$) to hold and stabilize the reference voltage.

In some embodiments, the ramp generator circuit may obtain the integration current (e.g., $i_{int}$) from a current supply. In some embodiments, the current supply may be part of the ramp generator. Alternatively, in some embodiments, the current supply may be implemented on a separate device external to the ramp generator circuit. In some embodiments, the current supply may include a current mirror circuit to generate the integration current (e.g., $i_{int}$). The current mirror circuit may include two semiconductor devices coupled with each other through which the first device may receive the bias voltage (e.g., $v_{bias}$) from the second device, where the first device generates the integration current (e.g., $i_{int}$) for the ramp generator circuit. Thus, fluctuation of the bias voltage (e.g., $v_{bias}$) received by the first device may cause fluctuation of the integration current (e.g., $i_{int}$) obtained by the ramp generator circuit. To reduce the fluctuation, in some embodiments, the current mirror circuit may include a switch coupled between the first and second devices of the current mirror circuit. The switch in-between may be selectively turned off to decouple the bias voltage (e.g., $v_{bias}$) received by the first device from the second device. As a result, the bias voltage (e.g., $v_{bias}$) may be substantially held to be stabilized. This may also lead to substantial reduction of fluctuation and thus stabilization of the integration current (e.g., $i_{int}$).

In some embodiments, turning off of the above described switches may be coordinated with readout and A-to-D conversion of pixel image signals. For example, in some embodiments, the switches may be turned off before A-to-D conversion of analog image signals, such that the reference voltage (e.g., $v_{ref}$), bias voltage (e.g., $v_{bias}$), and/or integration current (e.g., $i_{int}$) may be able to stay substantially stable during the A-to-D conversion. Once the A-to-D conversion is complete, these switches may be selectively turned back on.

FIG. 1 is a schematic diagram of an example ramp generator circuit, according to some embodiments. In FIG. 1, ramp generator circuit 100 may obtain reference voltage 102 (e.g., $v_{ref}$) and integration current 104 (e.g., $i_{int}$) to generate output voltage 106 (e.g., $v_{ramp}$). In some embodiments, output voltage 106 (e.g., $v_{ramp}$) may include one or more rising or falling portions. For purposes of illustration, in this example, ramp generator circuit 100 is shown as a single slope ramp generator circuit where output voltage 106 includes only linear rising portions. In some embodiments, ramp generator circuit 100 may be a single slope ramp generator circuit, a dual slope generator circuit, with rising and/or falling output voltages, and the like.

In FIG. 1, in some embodiments, ramp generator circuit 100 may include integrator circuit 110 having operational amplifier (op-amp) 112 and capacitor 114. Op-amp 112 may include one or more input and/or output terminals. Op-amp 112 may receive reference voltage 102 (e.g., $v_{ref}$) and integration current 104 (e.g., $i_{int}$) as input and generate voltage 106 (e.g., $v_{ramp}$) as output. When integration current 104 (e.g., $i_{int}$) is zero, output voltage 106 (e.g., $v_{ramp}$) may equal to reference voltage 102 (e.g., $v_{ref}$) (e.g., $v_{ramp}=v_{ref}$). When integration current 104 (e.g., $i_{int}$) is a non-zero current, the current may flow through and be integrated by capacitor 114. Given the direction of integration current 104 (e.g., $i_{int}$) is to flow out of op-amp 112, this may cause a rising output voltage (e.g., $v_{ramp}$) from $v_{ref}$. If lint is a constant current, $v_{ramp}$ may be a linear rising voltage. Thus, by controlling $i_{int}$, the rising slope, linearity, and/or value of $v_{ramp}$ may be adjusted. As shown in FIG. 1, in some embodiments, integrator circuit 110 may include reset switch 116 coupled between the output terminal of $v_{ramp}$ and input terminal of $i_{int}$. In some embodiments, integrator circuit 110 may selectively turn on switch 116 to reset $v_{ramp}$ to $v_{ref}$. As a result, $v_{ramp}$ may have a waveform shown in FIG. 1, as an example, according to some embodiments.

As shown in FIG. 1, in some embodiments, ramp generator circuit 100 may obtain $v_{ref}$ from a voltage supply. The output voltage $v_1$ from the voltage supply may fluctuate due to noises. In some embodiments, ramp generator circuit 100 may have a capacitor C1 at the input terminal of integrator circuit 110 to stabilize $v_{ref}$. However, due to practical design limits, the size of C1 may not be large enough to sufficiently hold $v_{ref}$. Thus, in some embodiments, ramp generator circuit 100 may include switch 120 coupled between ramp generator circuit 100 and the output voltage $v_1$ of the voltage supply. In some embodiments, ramp generator circuit 100 may selectively turn off switch 120 to decouple $v_{ref}$ (obtained by ramp generator 100) from $v_1$ (provided by the voltage supply) to thus hold $v_{ref}$ stable. For purposes of illustration, in the disclosure switch 120 is also called a "sample-and-hold" switch. As shown at bottom of FIG. 1, for example, during "sampling" time duration 132, control signal 130 may turn on switch 120 such that $v_{ref}$ equals $v_1$ and thus also includes noises like $v_1$. By comparison, during "holding" time duration 134, control signal 130 may turn off switch 120 such that $v_{ref}$ may be held at a substantially stable value.

As shown in FIG. 1, in some embodiments, a bias voltage 108 (e.g., $v_{bias}$) may be used for generating integration current $i_{int}$. In some embodiments, $v_{bias}$ may be provided from voltage $v_2$ which may have noises. Thus, to stabilize $v_{bias}$, in some embodiments, sample-and-hold switch 122 may be coupled between $v_{bias}$ and $v_2$. In some embodiments, switch 122 may be selectively turned off to decouple $v_{bias}$ from $v_2$ to thus substantially reduce fluctuation of $v_{bias}$ and hold its value stable. In some embodiments, the stabilization of $v_{bias}$ may also lead to stabilization of $i_{int}$. As a result, stabilization of $v_{ref}$, $v_{bias}$, and/or $i_{int}$ may also reduce noises of $v_{ramp}$. As $v_{ramp}$ is used in performance of A-to-D conversion of image signals, this may thus reduce noises and improve quality of the A-to-D conversion. In some embodiments, operations of reset switch 116 may cause noises. Thus, as shown in FIG. 1, in some embodiments, ramp generator circuit 100 may include capacitor C3 124 coupled to the input terminal of integrator circuit 110 to reduce impact of the noises and stabilize $i_{int}$. In some embodiments, capacitors C1 and/or C2 may be implemented using off-chip capacitors residing outside ramp generator circuit 100 in order to use large size capacitors. In some embodiments, the switches described above in FIG. 1 may be implemented using any appropriate types of semiconductor switching devices, e.g., MOSFETs, BJTs, and the like.

Figure 2A:
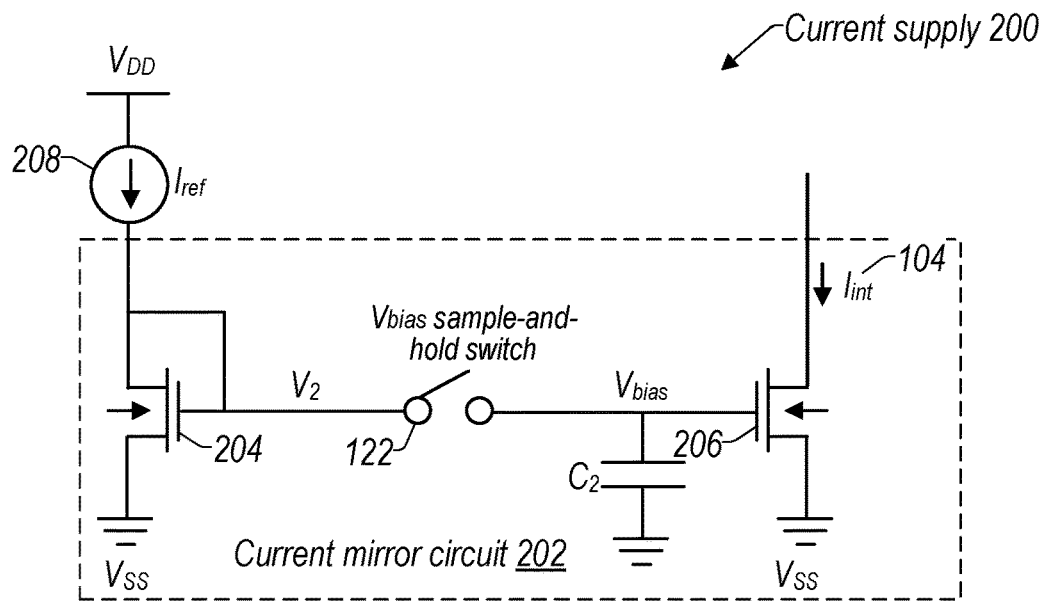
FIGS. 2A-2B are schematic diagrams of example current supplies for generating integration currents, according to some embodiments.
Figure 2B:
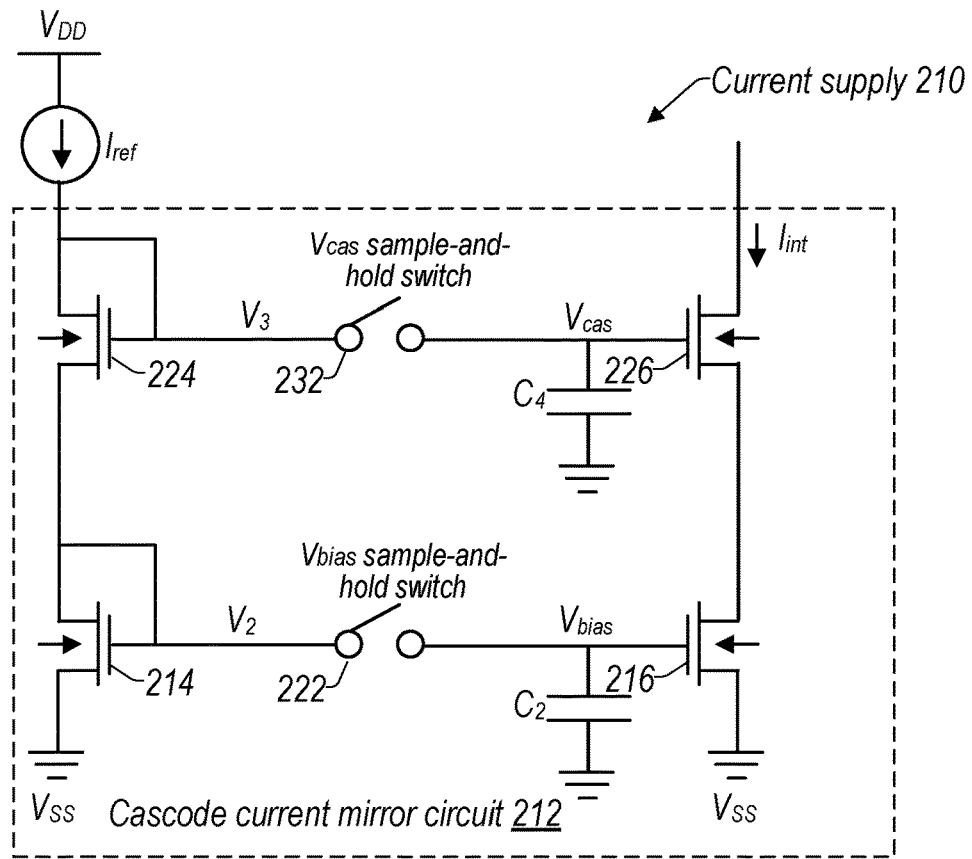

FIGS. 2A-2B are schematic diagrams of example current supplies for generating integration currents, according to some embodiments. As described above, in some embodiments, ramp generator circuit 100 may obtain the integration current (e.g., $i_{int}$) from a current supply. The current supply may be part of the ramp generator circuit, or a separate device external to the ramp generator circuit. Either way, the techniques disclosed herein may apply to reduce fluctuation and stabilize $v_{bias}$, and/or $i_{int}$. In FIG. 2A, in some embodiments, current supply 202 may include current mirror circuit 202. Current mirror circuit 202 may act like a current-to-current convert, which may receive input current 208 (e.g., $i_{ref}$), such as a constant or controllable current, and generate corresponding output current 104 based on input current 208 (e.g., $i_{ref}$). When current mirror circuit 202 is coupled with integrator circuit 110, as shown in FIG. 1, output current 104 then becomes the integration current (e.g., $i_{int}$) obtained by the integrator circuit. In some embodiments, current mirror circuit 202 may include at least two semiconductor devices 204 and 206, such as field effect transistor, bipolar junction transistors, etc. In FIG. 2A, devices 204 and 206 coupled back-to-back via their control terminals, and through the connection device 206 may receive a bias voltage (e.g., $v_{bias}$) from output voltage $v_2$ of device 204. In some embodiments, the two switches may be matched having substantially the same device properties. As a result, the value of input current 208 (e.g., $i_{ref}$) may be copied to output current 104 (e.g., $i_{int}$), and thus result in a gain of 1 between output and input. As described above, voltage $v_2$ may include noises which may propagate to $v_{bias}$. Thus, in some embodiments, current mirror circuit 202 may include sample-and-hold switch 122. In some embodiments, sample-and-hold switch 122 may be selectively turned off to decouple $v_{bias}$ from $v_2$ to thus hold $v_{bias}$ at a substantially stable value. As a result, the stabilization of $v_{bias}$ may also lead to stabilization of output current $i_{int}$. As shown in FIG. 2A, in some embodiments, current mirror circuit 202 may further include capacitor C2 coupled to device 206 to stabilize $v_{bias}$. In some embodiments, the gain of current mirror circuit 202 may be other numbers rather than 1, e.g., by changing the number of device 204 (at input) and/or device 206 (at output). For example, in some embodiments, current mirror circuit 202 may have m×devices 204 at input and n×devices 206 at output, and the gain may become n/m.

FIG. 2B shows another example current supply that may be used to generate the integration current (e.g., $i_{int}$) for ramp generator circuit 100, according to some embodiments. As shown in FIG. 2B, current supply 210 may include cascode current mirror circuit 212. Like current mirror circuit 202 in FIG. 2A, cascode current mirror circuit 212 may also include at least two semiconductor devices 214 and 216

(e.g., similar to devices 204 and 206) at input and output, where the switches are matched having substantially the same device properties. However, unlike current mirror circuit 202, cascode current mirror circuit 212 may further include at least one semiconductor device 224 and at least one semiconductor device 226 at input and output, respectively such as field effect transistor, bipolar junction transistors, etc. As shown in FIG. 2B, device 224 may be coupled in series with device 214 to form a cascode amplifier. Compared to current mirror circuit 202, the cascode amplifier formed by addition of device 224 may help to stabilize voltage $v_3$ by reducing the voltage's headroom and fluctuation (more than voltage $v_2$). Similarly, device 226 coupled in series with device 216 at output may form a cascode amplifier and reduce headroom and fluctuation of voltage $v_{cas}$. As a result, this may help to stabilize the output current $i_{int}$ generated by cascode current mirror circuit 212. In some embodiments, device 226 may match device 224 to have substantially the same device property. Further, in some embodiments, cascode current mirror circuit 212 may include sample-and-hold switch 222 between devices 214 and 216 (e.g., similar to sample-and-hold switch 122 in FIG. 2A), and sample-and-hold switch 232 between devices 224 and 226. Switch 222 may be selectively turned off to decouple $v_{bias}$ from $v_2$ (that is generated from device 214) to thus hold and stabilize $v_{bias}$, whereas switch 232 may be selectively turned off to decouple $v_{cas}$ from $v_3$ (that is generated from device 224) to thus hold and stabilize $v_{cas}$. In some embodiments, the two sample-and-hold switches may be turned off and on synchronously at or around the same time. Note that for purposes of illustration, the switches in FIGS. 2A-2B are shown as MOSFET devices as an example. In some embodiments, the switches may be implemented using any appropriate types of semiconductor switching devices, e.g., MOSFETs, BJTs, and the like.

Figure 3:
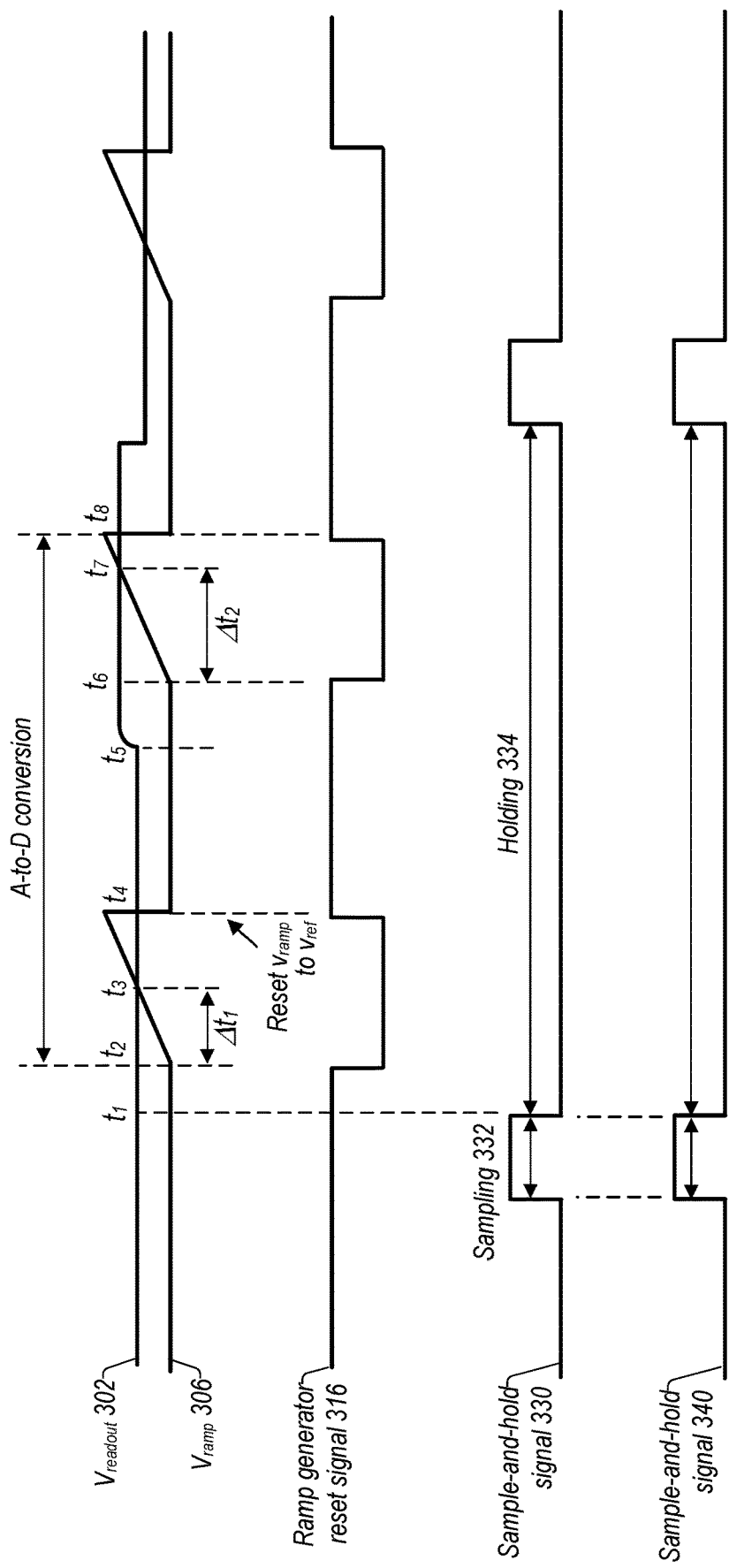
FIG. 3 is an example timing diagram showing coordination between operations of sample-and-hold switches and A-to-D conversion of an image signal, according to some embodiments.

As described above, in some embodiments, the sample-and-hold switches described above (e.g., 120, 122, 222, and/or 232) may be selectively turned off to hold the reference voltage (e.g., $v_{ref}$), bias voltage (e.g., $v_{bias}$), and/or integration current (e.g., $i_{int}$) during A-to-D conversion of image signals. Thus, operations of these switches may need to be coordinated with readout and A-to-D conversion of the image signals. For example, in some embodiments, operations of these switches may be coordinated with operations of the A-to-D conversion circuit(s). FIG. 3 is an example timing diagram showing coordination between operations of sample-and-hold switches and A-to-D conversion of an image signal, according to some embodiments. In FIG. 3, from top to bottom, the first waveform represents an amplified version of an analog image signal $v_{readout}$ 302 read out of a pixel, the second waveform represents an output voltage $v_{ramp}$ 306 generated by a ramp generator circuit (e.g., ramp generator circuit 100), the third waveform represents control signal 316 of a reset switch (e.g., reset switch 116) of the ramp generator circuit, the fourth waveform represents control signal 330 of the sample-and-hold switch (e.g., switch 120) for reference voltage (e.g., $v_{ref}$) of the ramp generator circuit, and the last waveform represents control signal 340 of the sample-and-hold switch (e.g., switch 122) for bias voltage (e.g., $v_{bias}$) of the current mirror circuit. In some embodiments, the amplified pixel image signal $v_{readout}$ 320 may be generated using an amplifier, e.g., a programmable gain amplifier (PGA). The PGA may receive the original pixel image signal (e.g., a raw voltage signal), invert the phase of the original image signal, and amplify it with a gain. The amplified image signal from the PGA may then be sampled and converted to a digital image signal, as described below. Thus, for purposes of illustration, the waveform of the amplified pixel image signal is provided in FIG. 3 in this example to illustrate the coordination between operations of sample-and-hold switches and A-to-D conversion of the image signal.

For purposes of illustration, in this example, A-to-D conversion of the pixel's image signal is implemented using a correlated double sampling (CDS), e.g., by an A-to-D conversion circuit, where the analog image signal may be sampled twice, the first before transfer of electrical charge out of the photodiode of the pixel and the second after transfer of the electrical charge. Thus, as shown in FIG. 3, before transfer of the electrical charge, $v_{readout}$ 302 may first be at a reset voltage. At time t5, the electrical charge starts to be transferred out of the photodiode. For purposes of illustration, in this example, $v_{readout}$ 302 may start to rise, and at time t6, settle at a settled voltage. As described above, the A-to-D conversion of $v_{readout}$ 302 may be performed by comparing $v_{readout}$ 302 against output voltage $v_{ramp}$ 306 of the ramp generator circuit. The time it takes for $v_{ramp}$ 306 to become equal with $v_{readout}$ 302 may be measured or calculated, based on which the digital value of $v_{readout}$ 302 may be determined. Thus, in FIG. 3, for the first sampling of CDS, the first time duration $\Delta t1$ (e.g., between t3 and t4) may be measured or calculated based on which the digital value of the first sample of $v_{readout}$ 302 may be determined. Similarly, for the second sample of CDS, the second time duration $\Delta t2$ (e.g., between t6 and t7) may be measured or calculated based on which the digital value of the second sample of $v_{readout}$ 302 may be determined. A difference between the two digital values may be determined, e.g., to cancel out impact of the reset voltage, and used as the final digital value of the image signal. Once the CDS is complete, the output voltage $v_{ramp}$ 306 may be reset to $v_{ref}$ at t8.

As shown in FIG. 3, in some embodiments, the ramp generator circuit may use signal 316 (and the reset switch, e.g., 116) to selectively reset $v_{ramp}$ to $v_{ref}$, e.g., by asserting signal 316 for the time duration between t4 and t6 to turn on the reset switch such that the ramp generator circuit may not generate the increasing voltage. As described above, in some embodiments, the ramp generator circuit may include a sample-and-hold switch (e.g., 120) to hold and stabilize the reference voltage (e.g., $v_{ref}$) obtained by the ramp generator circuit, and/or a sample-and-hold switch (e.g., 122 or 222) to hold and stabilize the bias voltage (e.g., $v_{bias}$) that is used for generating the integration current (e.g., $i_{int}$) obtained by the ramp generator circuit. As shown in FIG. 3, operations of the sample-and-hold switches may be controlled by the ramp generator circuit and/or the current mirror circuit using signals 330 and 340 respectively. Take the sample-and-hold switch (e.g., 120) for $v_{ref}$ as an example. During sampling time duration 332, the switch may be selectively turned on, such that $v_{ref}$ may be coupled with an output voltage provided by a voltage supply and thus may similarly include noises. In contrast, during holding time duration 334, the switch may be selectively turned off, such that such that $v_{ref}$ may be decoupled with the output voltage and thus held substantially stable. As shown in FIG. 3, holding time duration 334 may start before the above described A-to-D conversion of $v_{readout}$ 302. For example, in FIG. 3, holding time duration 334 may start no later than t2, when $v_{ramp}$ starts to rise (or in other words, when integrator circuit starts to integrate the integration current $i_{int}$), or even earlier at time t1 to provide an extra interval (between t1 and t2) for $v_{ref}$ to fully stabilize before $v_{ramp}$ starts to rise. In some embodiments, holding time duration 334 may end after the A-to-D conversion of $v_{readout}$ 302. For example, in FIG. 3, holding time duration 334 may last until time t8 when the CDS and A-to-D conversion of $v_{readout}$ 302 is complete. Referring back to FIG. 1, in some embodiments, the ramp generator circuit may include capacitor C1 coupled to the input terminal of $v_{ref}$. During holding time duration 334, holding of $v_{ref}$ may rely on capacitor C1. Thus, in some embodiments, capacitor C1 may be sized appropriately to ensure $v_{ref}$ may be held substantially stable by the capacitor for at least holding time duration 334.

Operation of the sample-and-hold switch (e.g., 122 or 222) for $v_{bias}$ may be substantially similar to the above described sample-and-hold switch (e.g., 120) for $v_{ref}$. For example, in some embodiments, the sample-and-hold switch (e.g., 122 or 222) for $v_{bias}$ may be selectively turned off before (e.g., no later than t2 or even at t1) the A-to-D conversion of $v_{readout}$ 302, and last until at least the A-to-D conversion is complete (e.g., until at least t8). Optionally, the sample-and-hold switch may be selectively turned on between the two samples of CDS in order to recharge capacitor C2 that is coupled to the terminal of $v_{bias}$. In some embodiments, the two sample-and-hold switches for $v_{ref}$ and $v_{bias}$ may be controlled synchronously, e.g., turned on and off at or around the same time, as shown in FIG. 3. Alternatively, in some embodiments, the two sample-and-hold switches may be operated asynchronously. In addition, as described above in FIG. 2B, in some embodiments, the ramp generator circuit and/or the current supply may include one or more additional sample-and-hold switches (e.g., 232 for $v_{cas}$). Those switches may be operated similarly to the sample-and-hold switches for $v_{ref}$ and $v_{bias}$ as described above. In some embodiments, all these sample-and-hold switches may be controlled synchronously to be turned on and off at or around the same time.

Figure 4:
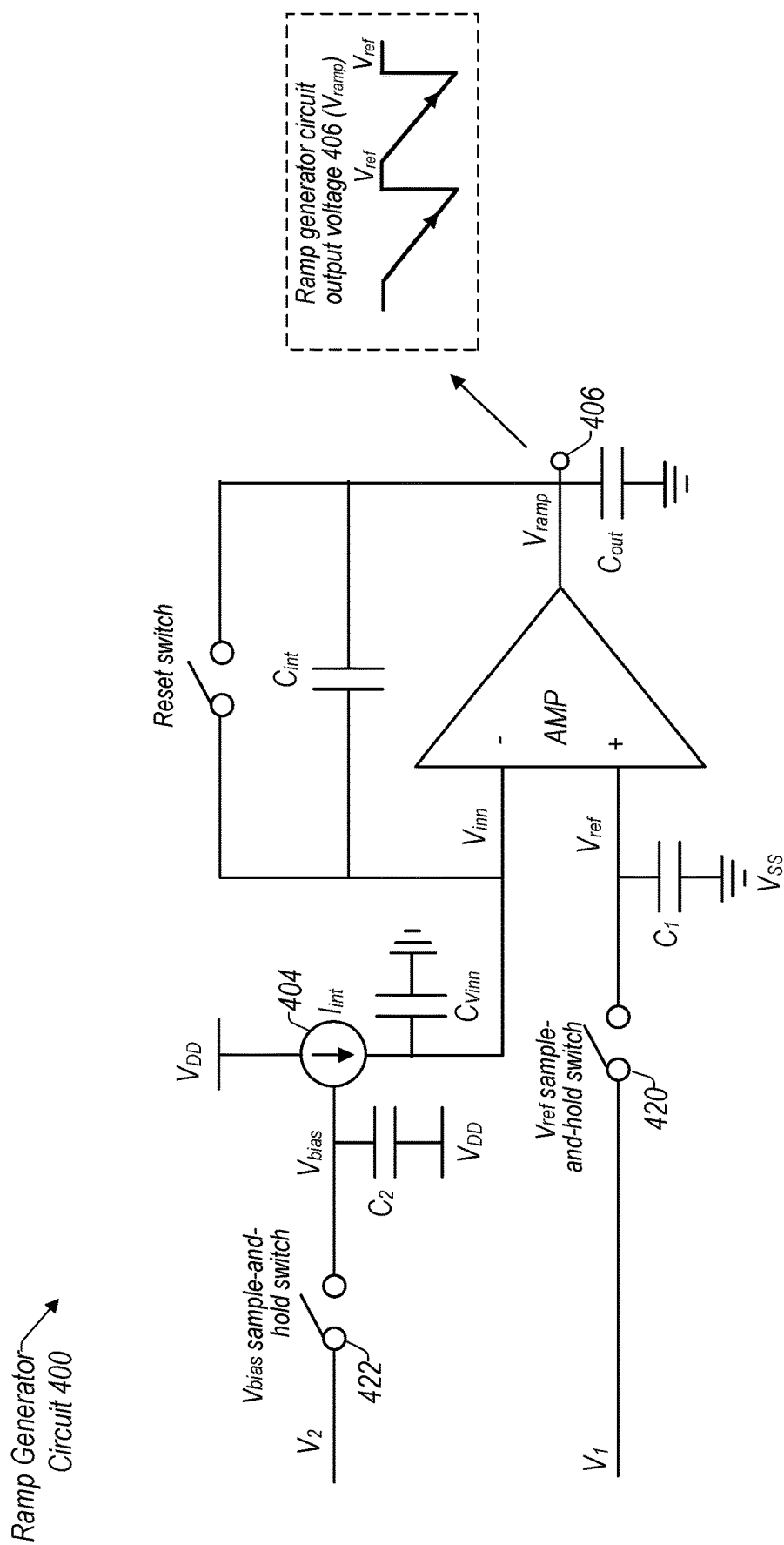
FIG. 4 is a schematic diagram of another example ramp generator circuit, according to some embodiments.

FIG. 4 is a schematic diagram of another example ramp generator circuit, according to some embodiments. As shown in FIG. 4, in some embodiments, ramp generator circuit 400 may be similar to ramp generator circuit 100 in FIG. 1. However, in FIG. 4, the integration current (e.g., $i_{int}$) 404 flows into, rather than out of, the integrator circuit of ramp generator circuit 400. As a result, output voltage 406 (e.g., $v_{ramp}$) of ramp generator circuit 400 may include one or more falling portions, as shown in FIG. 4, rather than the rising portions like output voltage 106 in FIG. 1. Similarly, in some embodiments, ramp generator circuit 400 may include sample-and-hold switch 420 for reference voltage (e.g., $v_{ref}$) and/or sample-and-hold switch 422 for reference voltage (e.g., $v_{bias}$). Accordingly, in some embodiments, ramp generator circuit 400 may selectively turn off switch 420 and/or 422 to hold $v_{ref}$, $v_{bias}$, and/or thus $i_{int}$ during A-to-D conversion of image signals.

Figure 5A:
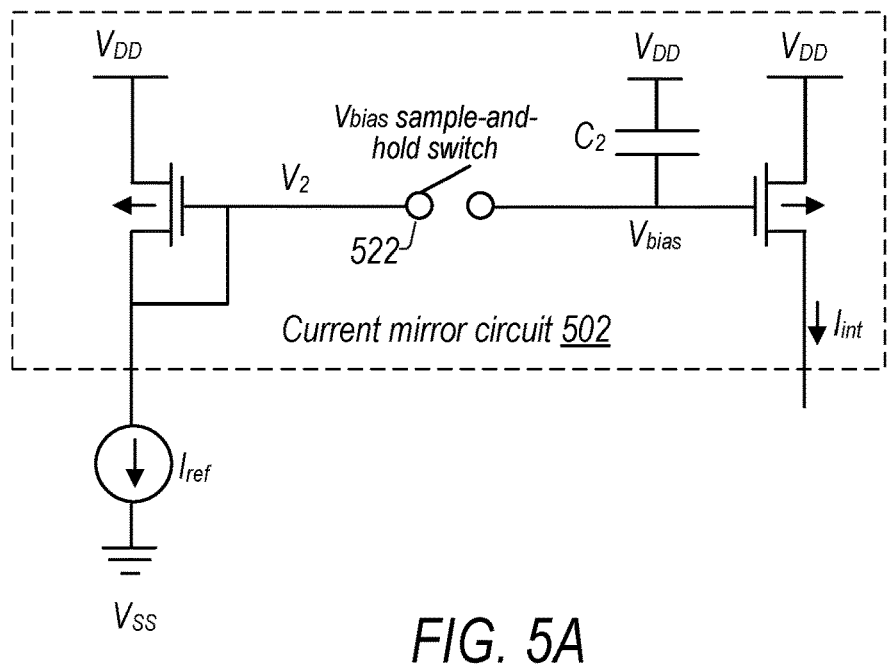
FIGS. 5A-5B are schematic diagrams of other example current supplies for generating integration currents, according to some embodiments.
Figure 5B:
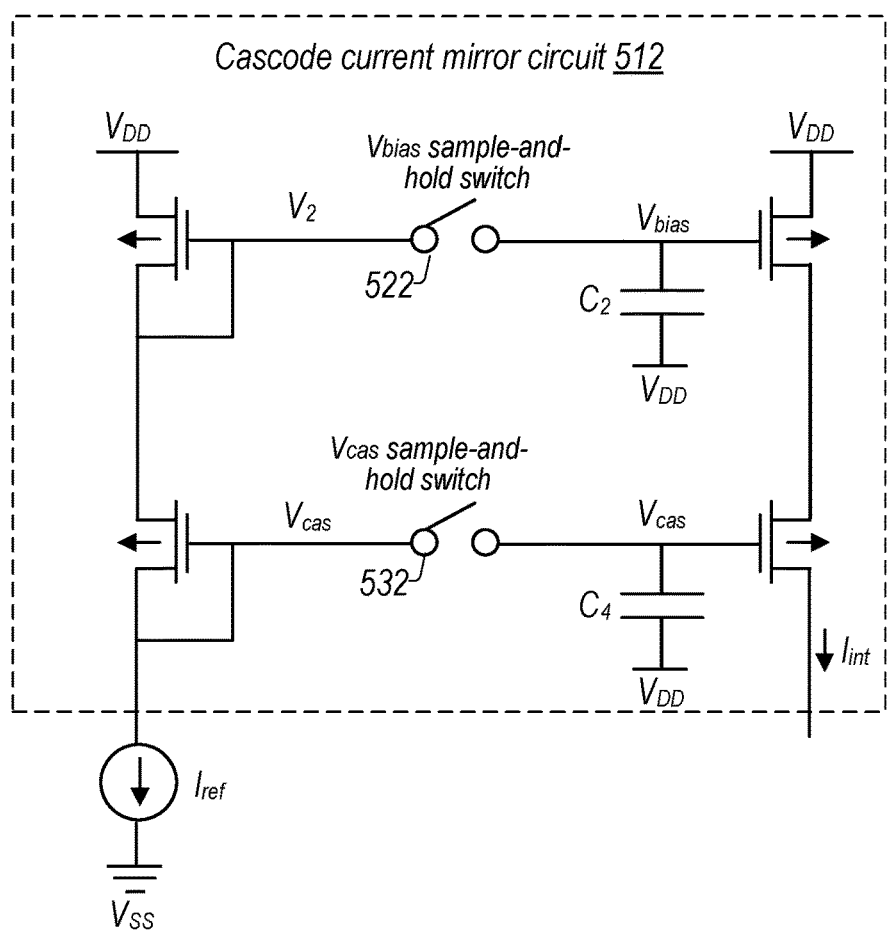

FIGS. 5A-5B are schematic diagrams of other example current supplies for generating integration currents, according to some embodiments. As shown in FIG. 5A, current mirror circuit 502 may be similar to current mirror circuit 302 in FIG. 3A. However, in FIG. 5A, current mirror circuit 502 may implement a current source, rather than a current sink like current mirror circuit 302. As a result, current mirror circuit 502 may be able to generate the integration current (e.g., $i_{int}$) to flow into, rather than out of, the integrator circuit of ramp generator circuit 400 as described above. Similarly, cascode current mirror circuit 512 in FIG. 5B may be similar to cascode current mirror circuit 312 in FIG. 3B, except that cascode current mirror circuit 512 may implement a current source instead of a current sink. As shown in FIGS. 5A-5B, in some embodiments, current mirror circuit 502 and cascode current mirror circuit 512 may include sample-and-hold switches 522 and 532 that may be selectively turned off to hold voltages $v_{bias}$ and $v_{cas}$.

Figure 6:
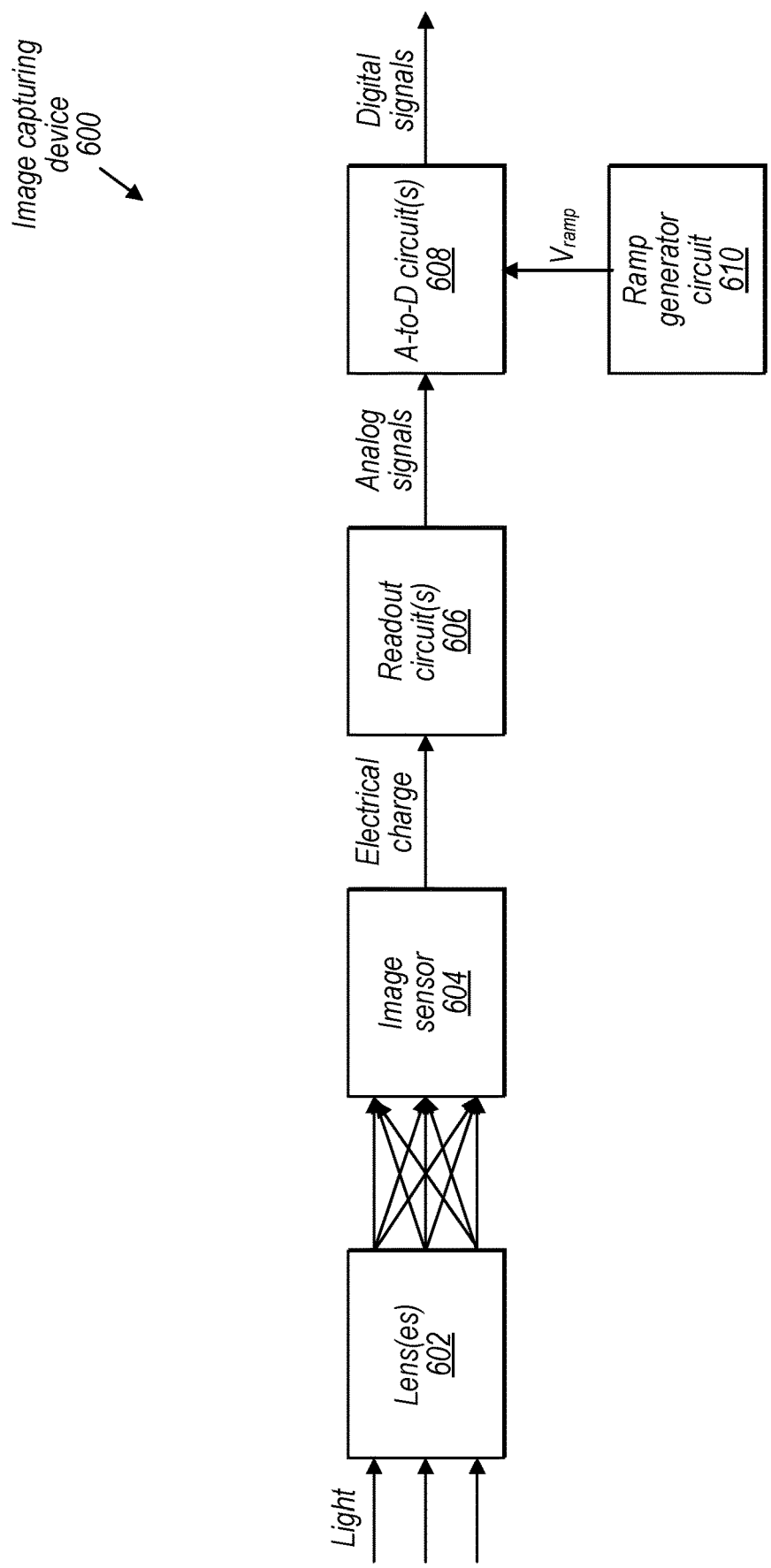
FIG. 6 is a block diagram showing an example image capturing device having a ramp generator circuit, according to some embodiments.

FIG. 6 is a block diagram showing an example image capturing device having a ramp generator circuit, according to some embodiments. As shown in FIG. 6, image capturing device 600, such as a camera, may include one or more lenses 602, image sensor 604, one or more readout circuits 606, one or more A-to-D conversion circuits 608, and ramp generator circuit 610. In some embodiments, image capturing device 600 may capture light from an environment. The light may pass through lenses 602 to reach image sensor 604. In some embodiments, image sensor 104 may have a plurality of light-gathering pixels. For example, image sensor 604 may be a CMOS image sensor, a CCD image sensor, and the like. The pixels of image sensor 604 may accumulate electrical charge when exposed to the light. At read out, readout circuits 606 may transfer the electrical charge out of photodiodes of the pixels to generate analog image signals, such as analog voltages. A-to-D conversion circuits 608 may convert the analog image signals to digital image signals, using the output voltage (e.g., $v_{ramp}$) from ramp generator circuit 610, as described above. The digital image signals may be provided, e.g., to an image signal processor (ISP), to be further processed to produce corresponding one or more images. As described above, in some embodiments, ramp generator circuit 610 (e.g., similar to the ramp generator circuits described above) may include one or more sample-and-hold switches (e.g., similar to the sample-and-hold switches described above) that may be selected turned off to hold the reference voltage (e.g., $v_{ref}$), bias voltage (e.g., $v_{bias}$), and/or integration current (e.g., $i_{int}$) during the A-to-D conversion of the pixel image signals.

Figure 7:
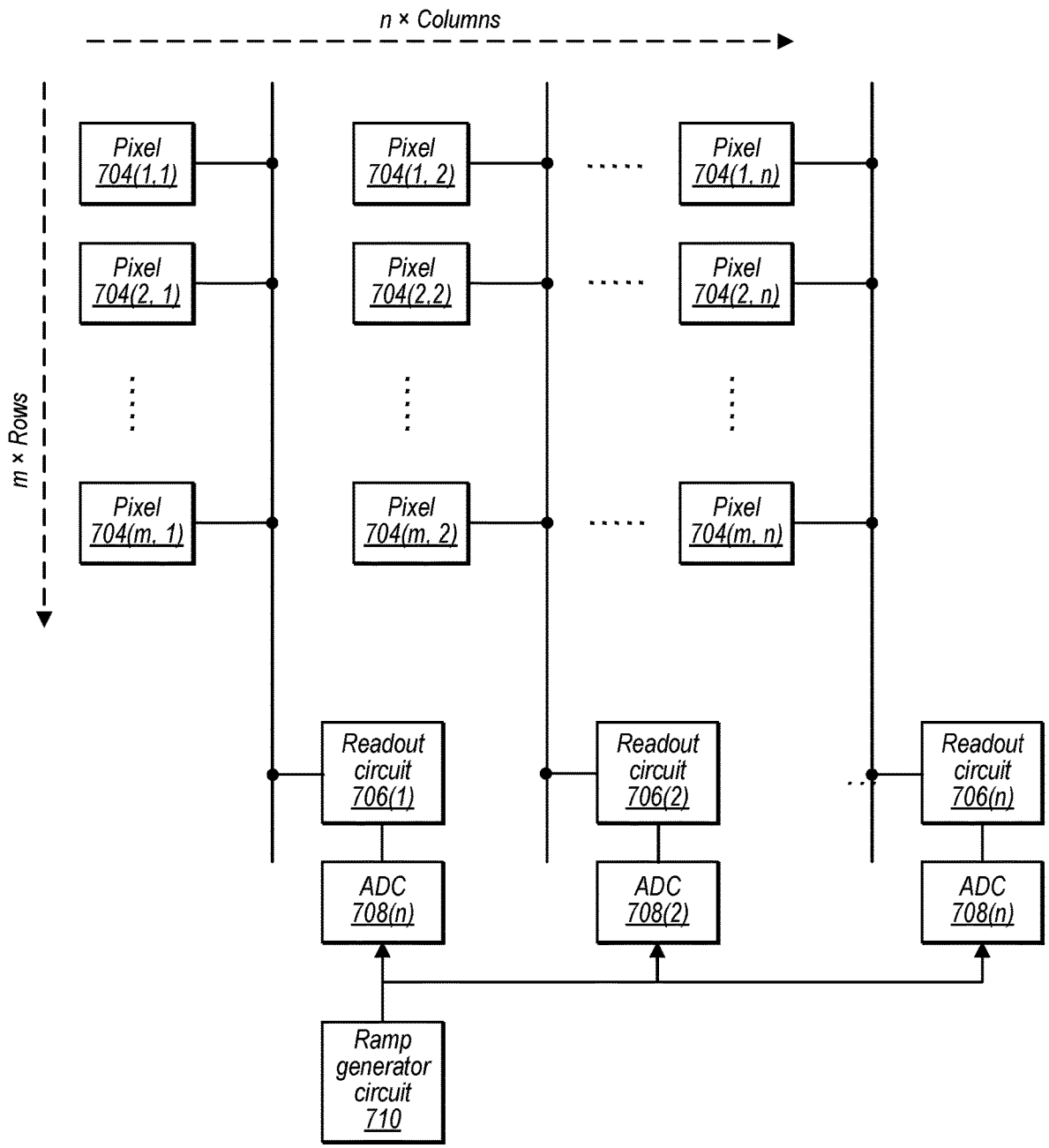
FIG. 7 is a block diagram of an example architecture for performing readout and A-to-D conversion of image signals of an image sensor, according to some embodiments.

FIG. 7 is a block diagram of an example architecture for performing readout and A-to-D conversion of image signals of an image sensor, according to some embodiments. As shown in FIG. 7, in some embodiments, an image sensor may include a plurality of light-gathering pixels 704, which may be organized into a pixel array. For example, in FIG. 7, pixels 704 may be organized into a (m×n) pixel array having (m×rows) and (n×columns), where m and n are both integers. The first column may include pixels 704(1, 1), 704(2, 1), . . . , 704(m, 1), the second column may include pixels 704(1, 2), 704(2, 2), . . . , 704(m, 2), and the last column may include pixels 704(1, n), 704(2, n) and 704(m, n). Further, in some embodiments, pixels on the same column may share the same readout circuit and A-to-D conversion circuit. For example, in FIG. 7, pixels 704(1, 1), 704(2, 1), . . . , 704(m, 1) of the first column may share readout circuit 706(1) and A-to-D conversion circuit 708(1), 704(1, 2), 704(2, 2), . . . , 704(m, 2) of the second column may share readout circuit 706(2) and A-to-D conversion circuit 708(2), and pixels 704(1, n), 704(2, n) and 704(m, n) of the last column may share circuit 706(n) and A-to-D conversion circuit 708(n). Each readout circuit 706 and A-to-D conversion circuit 708 may operate similarly to the readout circuits (e.g., 606) and A-to-D conversion circuits (e.g., 608) described above. Further, as shown in FIG. 7, in some embodiments, all the pixels may share the same ramp generator circuit 710, which may operate similarly to the ramp generator circuits described above.

In some embodiments, image signals of pixels 704 of the same column may be read out and A-to-D converted sequentially, whereas image signals of pixels 704 of the same row may be read out and A-to-D converted synchronously at or around the same time. Take the first column as an example. From top to bottom, pixel 704(1, 1) may be the first to be read out by readout circuit 706(1) and converted by A-to-D conversion circuit 708(1), pixel 704(2, 1) may be the second to be read out by readout circuit 706(1) and converted by A-to-D conversion circuit 708(1), and so on, until pixel 704(m, 1) may be the last to be read out and A-to-D converted. In addition, take the first row as an example. From left to right, pixels 704(1, 1), 704(1, 2), ... , 704(1, n) may be read out by their respective readout circuits 706(1)-706(n) and converted by their respective A-to-D conversion circuit 708(1)-708(n) synchronously at or around the same time.

Since image signals pixels on the same column are converted not at or around the same time, their A-to-D conversion may be subject to noises caused by fluctuation of the reference voltage (e.g., $v_{ref}$), bias voltage (e.g., $v_{bias}$), and/or integration current (e.g., $i_{int}$) of ramp generator circuit 710, as described above. Thus, in some embodiments, ramp generator circuit 710 may use one or more sample-and-hold switches, as described above, to hold and stabilize these electrical variables to reduce the row-to-row noises. In some embodiments, operations of ramp generator circuit 710 may need to be coordinated with readout and A-to-D conversion of image signals, as described above, e.g., in FIG. 3. Since ramp generator circuit 710 is shared by all the pixels 704 of the image arrange, operations of ramp generator circuit 710 may have to be coordinated with readout and A-to-D conversion of each of the pixels. In this example, pixels 704 of the same column may be read out and then A-to-D converted sequentially, whereas pixels 704 of the same row may be read out and A-to-D converted synchronously at or around the same time. Thus, in some embodiments, operations of ramp generator circuit 710 may be determined based on the sequential A-to-D conversion of pixels in one column. For example, ramp generator circuit 710 may selectively turn off the one or more sample-and-hold switches to enter (m×sampling time durations) sequentially, one before the A-to-D conversion of each of pixels 704(1, 1), 704(2, 1), ... , 704(m, 1) of the first column. As the A-to-D conversion of other columns are synchronized with the first column, the reference voltage (e.g., $v_{ref}$), bias voltage (e.g., $v_{bias}$), and/or integration current (e.g., $i_{int}$) held during the sampling time durations may be applied to pixels of the first columns, but also pixels of the other columns. Note that the above is provided only as an example for purposes of illustration. In some embodiments, the readout sequence between the row and column may be exchanged, such that pixels on the same columns may be read out at or around the same time, whereas pixels on the same row may be read out sequentially. In that case, the techniques disclosed herein may be still applied to reduce noises on column-to-column pixels.

Figure 8:
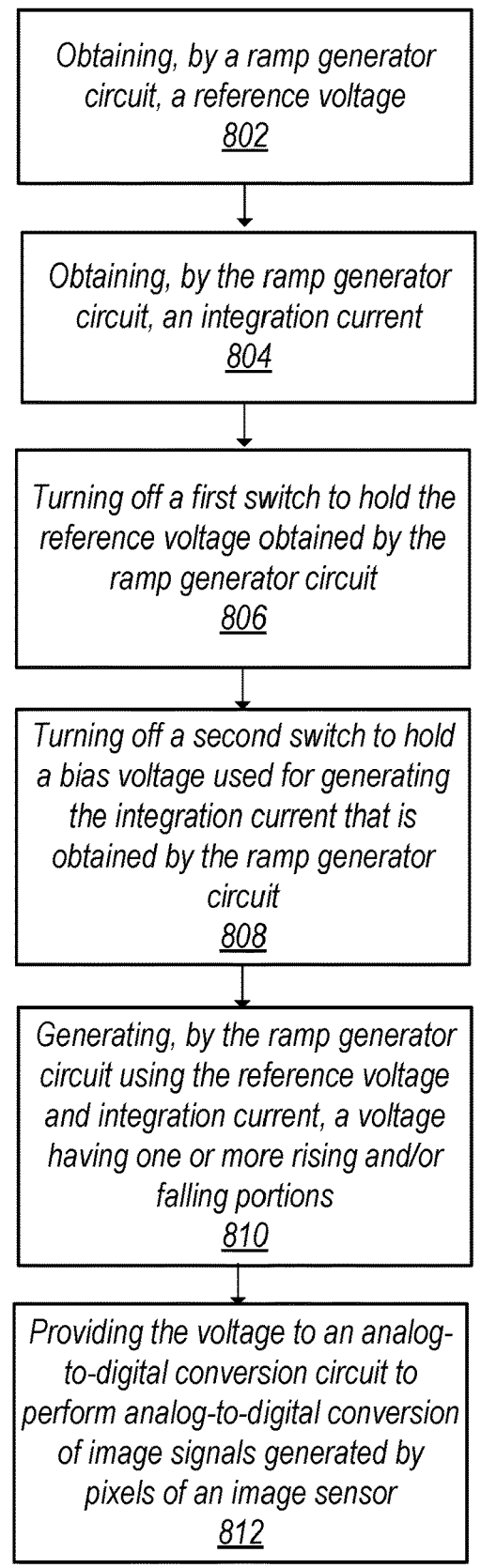
FIG. 8 is a flowchart showing an example method for reducing noises of a ramp generator circuit, according to some embodiments.

FIG. 8 is a flowchart showing an example method for reducing noises of a ramp generator circuit, according to some embodiments. As shown in FIG. 8, in some embodiments, a reference voltage (e.g., $v_{ref}$) may be obtained by a ramp generator circuit, e.g., from a voltage supply, as described above, as shown by block 802. In addition, in some embodiments, an integration current (e.g., $i_{int}$) may be obtained by the ramp generator circuit, e.g., from a current supply, as described above, as shown by block 804. To reduce the noises, in some embodiments, the ramp generator circuit may use one or more sample-and-hold switches to hold the reference voltage (e.g., $v_{ref}$) and/or a bias voltage (e.g., $v_{bias}$) that is used for generating the integration current (e.g., $i_{int}$). For example, in some embodiments, a first sample-and-hold switch may be selectively turned off to decouple $v_{ref}$ from an output voltage (e.g., $v_1$) provided by the voltage supply to thus hold $v_{ref}$ obtained by the ramp generator circuit, as described above, as shown by block 806. In addition, in some embodiments, a second sample-and-hold switch may be selectively turned off to hold $v_{bias}$ so that $i_{int}$ generated using $v_{bias}$ may also be stabilized, as described above, as shown by block 808. In some embodiments, the ramp generator circuit may use the held and stabilized $v_{ref}$ and $i_{int}$ to generate a voltage (e.g., $v_{ramp}$) having one or more rising and/or falling portions, as shown by block 810. In some embodiments, the voltage (e.g., $v_{ramp}$) of the ramp generator circuit may be provided to one or more A-to-D conversion circuits to perform A-to-D conversion of image signals from pixels of an image sensor, as described above, as shown by block 812.

Figure 9:
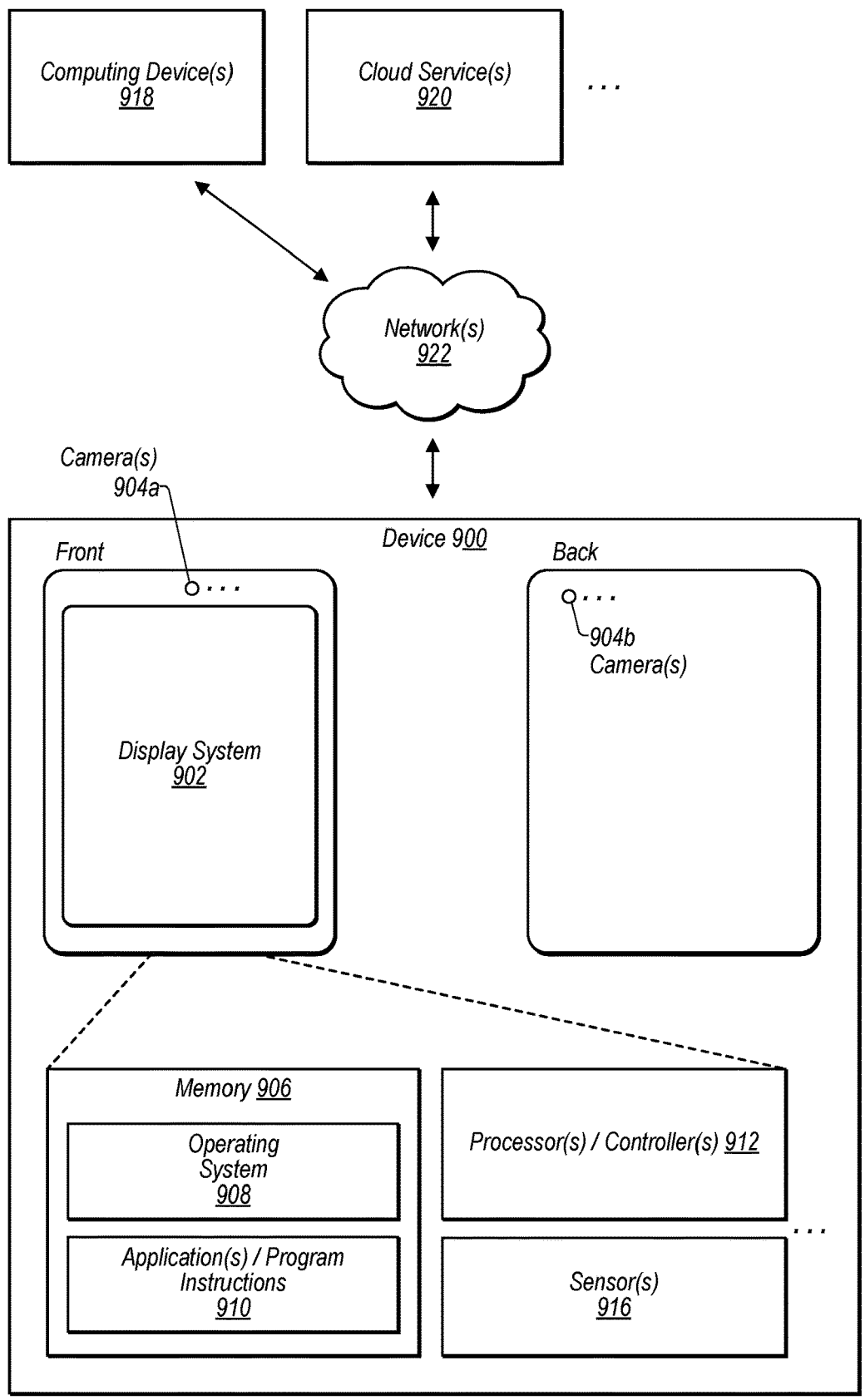
FIG. 9 is a schematic representation of an example device that may include the above described image capturing device having a ramp generator circuit, according to some embodiments.

FIG. 9 illustrates a schematic representation of an example device 900 that may include an image capturing device (e.g., a camera) having a ramp generator circuit as described above, according to some embodiments. In some embodiments, the device 900 may be a mobile device and/or a multifunction device. In various embodiments, the device 900 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In some embodiments, the device 900 may include a display system 902 (e.g., comprising a display and/or a touch-sensitive surface) and/or one or more cameras 904. In some non-limiting embodiments, the display system 902 and/or one or more front-facing cameras 904a may be provided at a front side of the device 900, e.g., as indicated in FIG. 9. Additionally, or alternatively, one or more rear-facing cameras 904b may be provided at a rear side of the device 900. In some embodiments comprising multiple cameras 904, some or all of the cameras may be the same as, or similar to, each other. Additionally, or alternatively, some or all of the cameras may be different from each other. In various embodiments, the location(s) and/or arrangement(s) of the camera(s) 904 may be different than those indicated in FIG. 9.

Among other things, the device 900 may include memory 906 (e.g., comprising an operating system 908 and/or application(s)/program instructions 910), one or more processors and/or controllers 912 (e.g., comprising CPU(s), memory controller(s), display controller(s), and/or camera controller(s), etc.), and/or one or more sensors 916 (e.g., orientation sensor(s), proximity sensor(s), and/or position sensor(s), etc.). In some embodiments, the device 900 may communicate with one or more other devices and/or services, such as computing device(s) 918, cloud service(s) 920, etc., via one or more networks 922. For example, the device 900 may include a network interface (e.g., network interface 1010) that enables the device 900 to transmit data to, and receive data from, the network(s) 922. Additionally, or alternatively, the device 900 may be capable of communicating with other devices via wireless communication using any of a variety of communications standards, protocols, and/or technologies.

Figure 10:
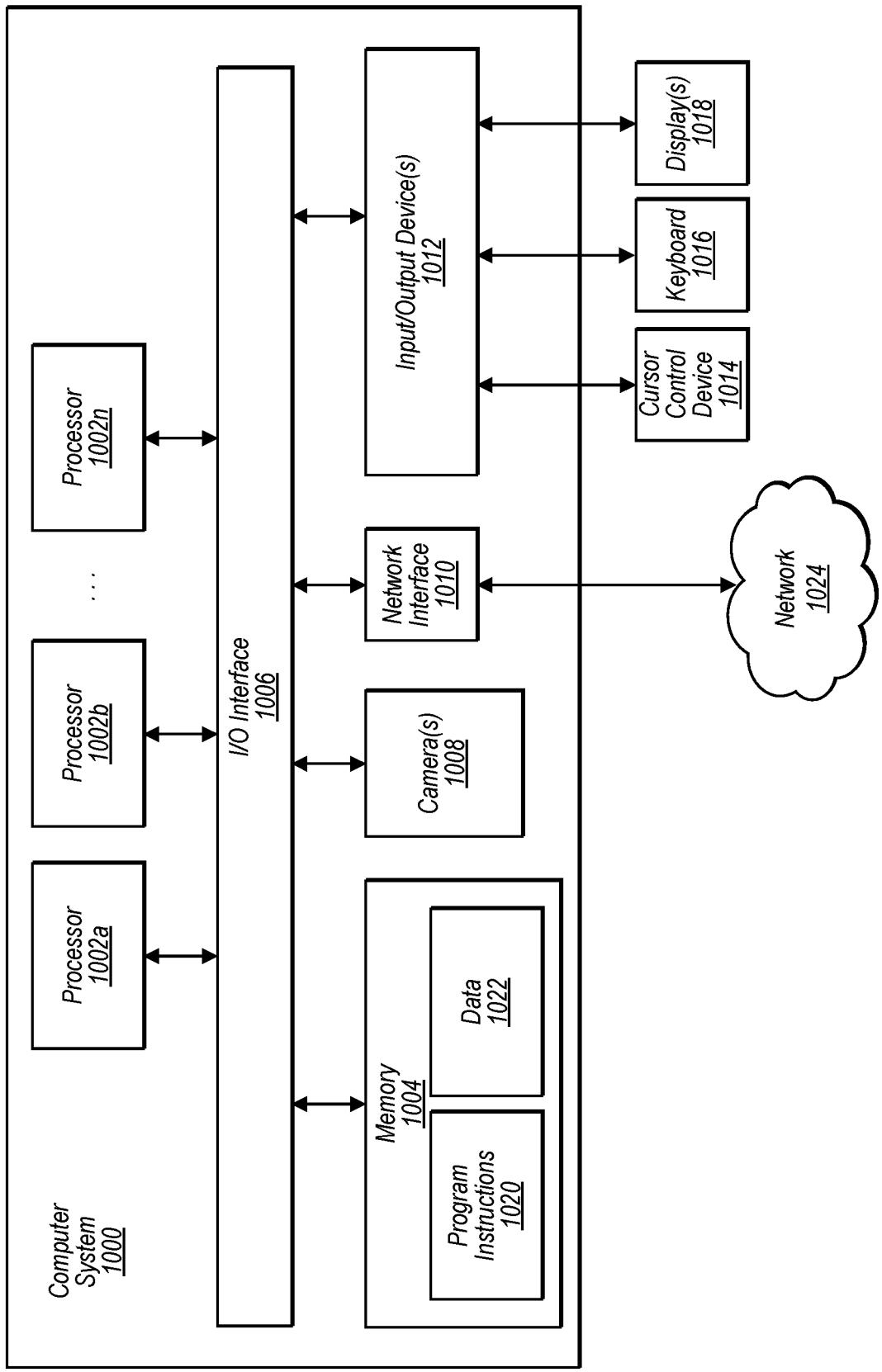
FIG. 10 is a schematic block diagram of an example computing device that may include or host embodiments of the above described image capturing device having a ramp generator circuit, according to some embodiments.

FIG. 10 illustrates a schematic block diagram of an example computing device, referred to as computer system 1000, that may include or host embodiments of an image capturing device (e.g., a camera) having a ramp generator circuit, e.g., as described above, according to some embodiments. In addition, computer system 1000 may implement methods for controlling operations of the camera and/or for performing image processing images captured with the camera. In some embodiments, the device 900 (described herein with reference to FIG. 9) may additionally, or alternatively, include some or all of the functional components of the computer system 1000 described herein.

The computer system 1000 may be configured to execute any or all of the embodiments described above. In different embodiments, computer system 1000 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In the illustrated embodiment, computer system 1000 includes one or more processors 1002 coupled to a system memory 1004 via an input/output (I/O) interface 1006. Computer system 1000 further includes one or more cameras 1008 coupled to the I/O interface 1006. Computer system 1000 further includes a network interface 1010 coupled to I/O interface 1006, and one or more input/output devices 1012, such as cursor control device 1014, keyboard 1016, and display(s) 1018. In some cases, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1002, or a multiprocessor system including several processors 1002 (e.g., two, four, eight, or another suitable number). Processors 1002 may be any suitable processor capable of executing instructions. For example, in various embodiments processors 1002 may be general-purpose or embedded processors implementing any of a variety of instruction set architectures (ISAs), such as the x86, PowerPC, SPARC, or MIPS ISAs, or any other suitable ISA. Also, in some embodiments, one or more of processors 1002 may include additional types of processors, such as graphics processing units (GPUs), application specific integrated circuits (ASICs), etc. In multiprocessor systems, each of processors 1002 may commonly, but not necessarily, implement the same ISA. In some embodiments, computer system 1000 may be implemented as a system on a chip (SoC). For example, in some embodiments, processors 1002, memory 1004, I/O interface 1006 (e.g. a fabric), etc. may be implemented in a single SoC comprising multiple components integrated into a single chip. For example, an SoC may include multiple CPU cores, a multi-core GPU, a multi-core neural engine, cache, one or more memories, etc. integrated into a single chip. In some embodiments, an SoC embodiment may implement a reduced instruction set computing (RISC) architecture, or any other suitable architecture.

System memory 1004 may be configured to store program instructions 1020 accessible by processor 1002. In various embodiments, system memory 1004 may be implemented using any suitable memory technology, such as static random access memory (SRAM), synchronous dynamic RAM (SDRAM), nonvolatile/Flash-type memory, or any other type of memory. Additionally, existing camera control data 1022 of memory 1004 may include any of the information or data structures used for implementing features associated with the ramp generator circuit described above. In some embodiments, program instructions 1020 and/or data 1022 may be received, sent or stored upon different types of computer-accessible media or on similar media separate from system memory 1004 or computer system 1000. In various embodiments, some or all of the functionality described herein may be implemented via such a computer system 1000.

In one embodiment, I/O interface 1006 may be configured to coordinate I/O traffic between processor 1002, system memory 1004, and any peripheral devices in the device, including network interface 1010 or other peripheral interfaces, such as input/output devices 1012. In some embodiments, I/O interface 1006 may perform any necessary protocol, timing or other data transformations to convert data signals from one component (e.g., system memory 1004) into a format suitable for use by another component (e.g., processor 1002). In some embodiments, I/O interface 1006 may include support for devices attached through various types of peripheral buses, such as a variant of the Peripheral Component Interconnect (PCI) bus standard or the Universal Serial Bus (USB) standard, for example. In some embodiments, the function of I/O interface 1006 may be split into two or more separate components, such as a north bridge and a south bridge, for example. Also, in some embodiments some or all of the functionality of I/O interface 1006, such as an interface to system memory 1004, may be incorporated directly into processor 1002.

Network interface 1010 may be configured to allow data to be exchanged between computer system 1000 and other devices attached to a network 1024 (e.g., carrier or agent devices) or between nodes of computer system 1000. Network 1024 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1010 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1012 may, in some embodiments, include one or more display terminals, keyboards, keypads, touchpads, scanning devices, voice or optical recognition devices, or any other devices suitable for entering or accessing data by one or more computer systems 1000. Multiple input/output devices 1012 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1010.

Those skilled in the art will appreciate that computer system 1000 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system, comprising:
   one or more lenses;
   an image sensor comprising a plurality of pixels configured to generate image signals based on light reaching the image sensor through the lenses;
   at least one ramp generator circuit configured to:
     obtain a reference voltage;
     obtain an integration current; and
     generate at least one voltage having one or more rising or falling portions using the reference voltage and integration current; and
   one or more analog-to-digital circuits configured to perform analog-to-digital conversion of the image signals of the pixels using the voltage generated from the ramp generator circuit,
   wherein the ramp generator circuit comprises:
     a first switch configured to be turned off to hold the reference voltage obtained by the ramp generator circuit; and
     a second switch configured to be turned off to hold a bias voltage that is used for generating the integration current obtained by the ramp generator circuit; and
   wherein the system is configured to:
     synchronize turning off the first switch with turning off the second switch before the analog-to-digital conversion of the image signals, such that the reference voltage and bias voltage are held during the analog-to-digital conversion of the image signals, or
     turn on the first switch and second switch after the analog-to-digital conversion of the image signals.

2. The system of claim 1, wherein the first switch couples the ramp generator circuit with a voltage provided by a voltage supply, such that turning off of the first switch decouples the reference voltage obtained by the ramp generator circuit from the voltage provided by the voltage supply.

3. The system of claim 1, wherein the ramp generator circuit comprises a current supply configured to generate the integration current, and wherein the current supply comprises a current mirror circuit having a first device coupled with a second device via the second switch through which the first device receives the bias voltage from the second device, such that turning off the second switch decouples the bias voltage received by the first device.

4. The system of claim 3, wherein the current supply further comprises a third device and a fourth device coupled respectively in series the first device and second device to form respective cascode amplifiers, and wherein the third and fourth devices are coupled with each other via a third switch, such that turning off the third switch decouples the third device from the fourth device.

5. The system of claim 1, wherein the first switch and second switch are turned off before the analog-to-digital conversion of the image signals, such that the reference voltage and bias voltage are held during the analog-to-digital conversion of the image signals.

6. The system of claim 5, wherein turning off of the first switch is synchronized with turning off of the second switch.

7. The system of claim 1, wherein the first switch and second switch are turned on after the analog-to-digital conversion of the image signals.

8. The system of claim 1, wherein the ramp generator circuit comprises an integrator circuit configured to receive the reference voltage and integration current as input and generate the voltage as output.

9. The system of claim 8, wherein the ramp generator circuit comprises at least one capacitor coupled to an input pin of the integrator circuit that receives the integration current.

10. The system of claim 8, wherein the integration current flows (a) into the integrator circuit such that the voltage generated by the ramp generator circuit includes only one or more rising portions, or (b) out of the integrator circuit such that the voltage generated from the ramp generator circuit includes only one or more falling portions.

11. The system of claim 1, wherein the ramp generator circuit comprises at least one reset switch configured to reset the voltage generated by the ramp generator circuit to the reference voltage.

12. A circuit, comprising:
an integrator circuit configured to receive a reference voltage and a current as input and generate a voltage having one or more rising or falling portions as output;
a first switch configured to be turned off to hold the reference voltage received by the integrator circuit;
a second switch configured to be turned off to hold a bias voltage used in generation of the current received by the integrator circuit; and
a current supply configured to generate the current, wherein the current supply comprises a current mirror circuit having a first device coupled with a second device via the second switch through which the first device receives the bias voltage from the second device, such that turning off the second switch decouples the bias voltage received by the first device.

13. The circuit of claim 12, wherein the first switch couples the integrator circuit with a voltage provided by a voltage supply, such that turning off of the first switch decouples the reference voltage received by the integrator circuit from the voltage provided by the voltage supply.

14. The circuit of claim 12, wherein the integrator circuit is coupled with a current supply configured to provide the integration current, wherein the current supply comprises a current mirror circuit having a first device coupled with a second device via the second switch through which the first device receives the bias voltage from the second device, such that turning off the second switch decouples the bias voltage received by the first device.

15. The circuit of claim 12, wherein the circuit is part of an image capturing device, wherein the image capturing device comprises an image sensor including a plurality of pixels configures to generate image signals based on light passing through one or more lenses of the image capturing device, and wherein the first switch and second switch are turned off before analog-to-digital conversion of the image signals, such that the reference voltage and bias voltage are held during the analog-to-digital conversion of the image signals.

16. The circuit of claim 12, further comprising at least one capacitor coupled to an input pin of the integrator circuit that receives the integration current.

17. A device, comprising:
an image capturing device, comprising:
one or more lenses;
an image sensor comprising a plurality of pixels configured to generate image signals based on light reaching the image sensor through the lenses;
at least one ramp generator circuit configured to:
obtain a reference voltage;
obtain an integration current; and
generate at least one voltage having one or more rising or falling portions using the reference voltage and integration current; and
one or more analog-to-digital circuits configured to convert the image signals of the pixels from analog signals to digital signals using the voltage generated from the ramp generator circuit,
wherein the ramp generator circuit comprises:
a first switch configured to be turned off to hold the reference voltage obtained by the ramp generator circuit; and
a second switch configured to be turned off to hold a bias voltage that is used for generating the integration current obtained by the ramp generator circuit; and
wherein the image capturing device is configured to:
synchronize turning off the first switch with turning off the second switch before the analog-to-digital conversion of the image signals, such that the reference voltage and bias voltage are held during the analog-to-digital conversion of the image signals, or
turn on the first switch and second switch after the analog-to-digital conversion of the image signals;
a processor configured to process the digital signals to produce one or more images; and
a display configured to display the images.

18. The device of claim 17, wherein the first switch couples the ramp generator circuit with a voltage provided by a voltage supply, such that turning off of the first switch decouples the reference voltage obtained by the ramp generator circuit from the voltage provided by the voltage supply.

19. The device of claim 17, wherein the ramp generator circuit comprises a current supply configured to generate the integration current, and wherein the current supply comprises a current mirror circuit having a first device coupled with a second device via the second switch through which the first device receives the bias voltage from the second device, such that turning off the second switch decouples the bias voltage received by the first device.

20. The device of claim 17, wherein the first switch and second switch are turned off before the analog-to-digital conversion of the image signals, such that the reference voltage and bias voltage are held during the analog-to-digital conversion of the image signals.

* * * * *